US012392084B2

(12) United States Patent
Mano et al.

(10) Patent No.: US 12,392,084 B2
(45) Date of Patent: Aug. 19, 2025

(54) POST PRINTING APPARATUS AND METHOD FOR DRYING AND CURING PRINTED TEXTILES

(71) Applicant: Kornit Digital Ltd., Rosh HaAyin (IL)

(72) Inventors: Ilan Shmuel Mano, Ramat-Gan (IL); Jacob Mann, Zoran (IL); Avi Feinschmidt, Holon (IL); Ibrahim Darwish, Jerusalem (IL)

(73) Assignee: Kornit Digital Ltd., Rosh HaAyin (IL)

( * ) Notice: Subject to any disclaimer, the term of this patent is extended or adjusted under 35 U.S.C. 154(b) by 0 days.

(21) Appl. No.: 18/755,843

(22) Filed: Jun. 27, 2024

(65) Prior Publication Data

US 2024/0344269 A1 Oct. 17, 2024

Related U.S. Application Data

(63) Continuation of application No. PCT/IL2022/051397, filed on Dec. 27, 2022.

(Continued)

(51) Int. Cl.

*D06P 5/20* (2006.01)
*B41J 3/407* (2006.01)
*B41J 11/00* (2006.01)

(52) U.S. Cl.

CPC ........... *D06P 5/2083* (2013.01); *B41J 3/4078* (2013.01); *B41J 11/00212* (2021.01);

(Continued)

(58) Field of Classification Search

CPC ..... D06P 5/2083; D06P 5/2077; B41J 3/4078; B41J 11/00212; B41J 11/00216; B41J 11/00222

See application file for complete search history.

(56) References Cited

U.S. PATENT DOCUMENTS

2002/0044188 A1* 4/2002 Codos ........................ D06P 5/30 347/106
2003/0043246 A1 3/2003 Codos (Continued)

FOREIGN PATENT DOCUMENTS

CN 109815777 5/2019
CN 112666912 4/2021

(Continued)

OTHER PUBLICATIONS

International Preliminary Report on Patentability Dated Jul. 11, 2024 From the International Bureau of WIPO Re. Application No. PCT/IL2022/051320. (6 Pages).

(Continued)

*Primary Examiner* — Bradley W Thies

(57) ABSTRACT

A post printing apparatus for drying and curing printed textiles, comprises a first, pre-curing, section to dry a printed textile, a second, curing, section to cure the dried textile from the first section, and a controller. The controller obtains data of the printing of the printed textile and uses that data to control timing and/or temperature of one or both of the first section and the curing section. The apparatus may thus provide a customized post printing process for different kinds and colors of garments and the different printing processes that they may have undergone.

23 Claims, 12 Drawing Sheets
(12 of 12 Drawing Sheet(s) Filed in Color)

Related U.S. Application Data

(60) Provisional application No. 63/293,887, filed on Dec. 27, 2021, provisional application No. 63/293,883, filed on Dec. 27, 2021.

(52) U.S. Cl.
CPC .... *B41J 11/00216* (2021.01); *B41J 11/00222* (2021.01); *D06P 5/2077* (2013.01)

(56) References Cited

U.S. PATENT DOCUMENTS

| | | | |
|---|---|---|---|
| 2010/0082120 | A1 | 4/2010 | Stephenson |
| 2020/0189295 | A1 | 6/2020 | Mombourquette et al. |
| 2021/0114370 | A1 | 4/2021 | Mizusawa |

FOREIGN PATENT DOCUMENTS

| | | |
|---|---|---|
| EP | 1212195 | 11/2006 |
| WO | WO 2015/123242 | 8/2015 |
| WO | WO 2020/190328 | 9/2020 |
| WO | WO 2023/126912 | 7/2023 |
| WO | WO 2023/126929 | 7/2023 |

OTHER PUBLICATIONS

International Preliminary Report on Patentability Dated Jul. 11, 2024 From the International Bureau of WIPO Re. Application No. PCT/IL2022/051397. (8 Pages).

International Search Report and the Written Opinion Dated Jun. 25, 2023 From the International Searching Authority Re. Application No. PCT/IL2022/051397. (13 Pages).

International Search Report and the Written Opinion Dated Mar. 31, 2023 From the International Searching Authority Re. Application No. PCT/IL2022/051320 (12 Pages).

Biran et al. "Bacterial Genotoxicity Bioreporters", Microbial Biotechnology, 3(4): 412-427, Published Online Dec. 29, 2009.

Bjerketorp et al. "Advances in Preservation Methods: Keeping Biosensor Microorganisms Alive and Active", Current Opinion in Biotechnology, 17(1): 43-49, Published Online Dec. 20, 2005.

Magrisso ct al. "Microbial Reporters of Metal Bioavailability", Microbial Biotechnology, 1(4): 320-330, Jul. 2008.

Moraskie et al. "Microbial Whole-Cell Biosensors: Current Applications, Challenges, and Future Perspectives", Biosensor & Bioelectronics, 191: 113459-1-113359-18, Published Online May 23, 2021.

Shemer et al. "Detection of Buried Explosives With Immobilized Bacterial Bioreporters", Microbial Biotechnology, 14(1): 251-261, Published Online Oct. 23, 2020.

Shemer et al. "Microbial Biosensors for the Detection of Organic Pollutants", Handbook of Cell Biosensors, p. 851-874, 2022.

Van der Meer et al. "Where Microbiology Meets Microengineering: Design and Applications of Reporter Bacteria", Nature Reviews Microbiology, 8(7): 511-522, Published Online Jun. 1, 2010.

* cited by examiner

Test conditions

- Height = 25mm, 60mm
- Power = 50-90%
- Time = 40sec

POST PRINTING APPARATUS AND METHOD FOR DRYING AND CURING PRINTED TEXTILES

RELATED APPLICATIONS

This application is a Continuation of PCT Patent Application No. PCT/IL2022/051397 having International filing date of Dec. 27, 2022, which claims the benefit of priority under 35 USC § 119 (e) of U.S. Provisional Patent Application Nos. 63/293,883 and 63/293,887, both filed on Dec. 27, 2021. The contents of the above applications are all incorporated by reference as if fully set forth herein in their entirety.

FIELD AND BACKGROUND OF THE INVENTION

The present invention, in some embodiments thereof, relates to a post printing apparatus and method for textile printers and, more particularly, but not exclusively, to an apparatus that provides for drying, curing and like post-printing functions.

Textile printers use inks and pre-printing and/or post-printing liquids to print images on the textile. Following printing there is accordingly a need to dry the textile of liquid and to cure the ink, and thus post-printing stages are generally provided in which the textile is dried and cured.

In particular, digital textile printers produce many different end-results in terms of graphical elements on wet garments, with different attributes of the substrate (textile garment, or media) and the laydown (materials on the fabric such as pre-treatment fluids, inks, etc.). That is to say, unlike printing with paper, printing of textiles may use a range of different pre-printing fluids, a range of different kinds of textile a range of different printing procedures and a range of different kinds of inks and other liquids. The results all interact with each other to produce drying and curing environments which may differ markedly from each other.

The printed garments may then undergo a drying and curing process, where all or most of the fluids are evaporated to dry the textile and the ink materials are cured, specifically molecularly crosslinked to create the final print.

Furthermore, in digital printing process, there are specific considerations. Firstly digital printing may use large amounts of fluids, for example as compared to the relatively small amounts in screen printing. Secondly there is a large span of liquid density between printed garments. Thus the liquid density may vary between say 10 $gr/m^2$ and 100 $gr/m^2$ for specific fabrics and garments.

Certain fabrics are particularly sensitive to drying conditions, for example, polyester, blends, etc.

Accordingly, digital printing systems may use relatively large drying and curing units to evaporate and cure in a way that is sufficient for all possible options of say garment sizes, fabric types, and amounts and types of fluids. The design is generally a worst case design and thus has high power consumption (gas and/or electrical) and long drying and curing times. The drying process may be set up in advance, in terms of temperature and time, for a session but is necessarily set to the worst case option for the entire session. This is fine where the entire session prints the same identical images on identical garments but the idea of digital printing is to provide the flexibility to alternate easily between different garments and different images. Thus the session setup is often overkill for many, if not most, of the garments being printed. Thus the setup is aimed at the highest absorption garments which often require the highest levels of pretreatment, and images which are printed with an undercoat. By contrast, low absorption garments, garments where an undercoat is not used, garments using only a small amount of pretreatment, and designs involving low ink coverage end up being overprocessed.

The different attributes of the printed garments and fluids used need to be supported by digital printers and post printing systems, as the digital printer is the versatile workhorse of the textile printing industry and is expected to be universal in its application. Thus the post printing systems are expected to have drying and curing facilities to support all prints produced. In practice this means that the dryer is preset to cover all optional use-cases with a single setup, meaning one specific air temperature and drying time when the garment is within the section. The setup usually remains constant throughout the day, since changing it is a relatively long process, typically taking some 15-30 minutes, during which time the associated printers are essentially paused.

The current method thus uses a single setting for a range of different printing conditions, hence a single temperature, regardless of the energy required by any specific print, a single time, in terms of a conveyer velocity, usually set to the longest predicted time, and side-effects caused by applying too much energy to the print or garment (e.g., staining of light colors garment), which is particularly problematic with the more sensitive garments.

Equally well, in specific cases, say of especially thick fabrics, and very wet garments, the drying and/or curing process may not be sufficient and harm the print quality.

The overall consequence is a single setting system with longer drying time and higher temperature than required by most cases, resulting in a reduced throughput of ready shirts per hour, higher energy consumption, and possible reduced quality.

In printers the print quality and the printer throughput are improved continuously; many different setups are used to achieve this, in accordance with the media type, required throughput, cost limitations and print quality. However, a side effect is that the amount of fluids on the garments may differ a great deal from print to print, even by a factor of 10. Thus for example a white shirt with a small image, such as a company logo, may use far less fixation fluid and ink than say a dark shirt with large image, the latter often also needing a white coating layer to go under the image.

Moreover, the media types are also continuously increasing, with new kinds of textile media being introduced into the catalog, such as polyester, blends, new colors, special treatments etc. The new types of media add to the list of conditions that need to be catered for. For example, polyester requires less fluid than cotton.

Thus, current practice in the art of using a common setup aimed at the most demanding combination of garment/print, is not optimal for most of the garments being printed, and the overall effect is a waste of energy and time and a dryer with a footprint and size too high for most of its usage. It is possible to change the settings of the dryer, however, as discussed above, it takes a considerable amount of time to change the settings of the drying/curing apparatus, during which time the printer is out of action.

A single system is used for drying the fluids and curing the ink; hence, one setup must be used for drying and curing, even when physically the two processes are different and may require different conditions; for example the drying stage may need to evacuate the vapors from the drying process using blowers, which involves continuously heating the drier in order to keep to the set temperature. By contrast, in the curing process almost no vapors are present and therefore a blower is not needed to evacuate the vapors, and accordingly energy is wasted on heating the drier.

Different fabric materials may limit the setup of the dryer to avoid causing damage to the fabric or reducing the quality of the print. For example, the drying and curing temperature for cotton is 150-160° C. but if this temperature is used on polyester, then it may cause dye (color) migration from the fabric to the image. Hence, for polyester the temperature is limited to 100-110C thus, commonly a different dryer is used for polyester prints, or the same dryer must be set and reset every time.

International Patent Publication No. WO 2015/123242, published 20$^{th}$ August 2015 to Brown Manufacturing Group Inc. discloses an ink curing apparatus which is a single stage and includes heating element. The heating element is controlled under closed loop control based on thermal vision radiation of the object being cured, which may be a printed textile.

SUMMARY OF THE INVENTION

The present embodiments may provide at least two post-printing stages, at least one of which is independently controllable based on variables from the printing procedure. Thus the drying temperature and/or the drying time or the curing temperature and/or the curing time may be controlled, depending on data from sensors associated with the printing process or from data and/or programming instructions associated with the printing process. In an embodiment, there may be one drying stage in which a standard drying temperature or time is applied, and a second drying stage where data to do with the printing process is provided to adjust the process as needed for the specific textiles being printed.

According to an aspect of some embodiments of the present invention there is provided post printing apparatus for drying and curing printed textiles, comprising:

- A first, pre-curing, section configured to heat a printed textile;
- a second, curing, section configured to heat an at least partly dried textile from the first section; and
- a controller, configured to obtain data of the printing of the printed textile and to use the data to control at least one of timing, power and temperature of at least one of the first, pre-curing, section and the second, curing, section respectively.

In embodiments, the data comprises programming data of a batch of printing operations. In embodiments, the data comprises programming data of printing of an individual textile.

In embodiments, the data comprises sensor data of a printer.

In embodiments, the data comprises an indication of a density of pre-printing fluid applied to the printed textile.

In embodiments, the data comprises an indication of an amount of ink applied to the printed textile.

In embodiments, the data comprises an indication of a number of layers of ink applied to the printed textile.

In embodiments, the data comprises an indication of a size of the printed textile.

In embodiments, the data comprises an indication of a color of the printed textile prior to printing.

In embodiments, the data comprises an indication of colors printed onto the printed textile.

In embodiments, the controller is configured to translate the data into a time required to operate the first, pre-curing, section to at least partly dry the garment.

In embodiments, the controller is configured to translate the data into a temperature required to operate the first, pre-curing, section to at least partly dry the garment.

In embodiments, the controller is configured to translate the data into a time required to operate the second, curing, section to carry out the curing.

In embodiments, the controller is configured to translate the data into a temperature required to operate the second, curing, section to carry out curing of the printed textile.

In embodiments, hot air is provided to one or both of the first, pre-curing, section and the second, curing, section and the controller is configured to control a temperature within the one or both of the sections by modulating an amount of the hot air.

In embodiments, one or both of the first, pre-curing, section and the second, curing, section comprises at least one heat emitter, and the controller is configured to control a temperature within one or both of the sections by controlling a parameter of the emitter.

In embodiments, the emitter is one member of the group comprising a microwave emitter, an infra-red emitter and a radio frequency emitter.

In embodiments, the parameter may be one or more of: height of the emitter in the section, power, time, width, and an on/off duty cycle.

Embodiments may include an intermediate station between the first section and the second, curing, section.

Such an intermediate station may apply softener to the printed garment after first section and prior to second section. A final section may apply ironing to the textile.

According to a second aspect of the present embodiments there is provided a post printing method for drying and curing printed textiles, comprising:

- obtaining a wet printed textile from a printer;
- obtaining printing data of the textile;
- heating the wet printed textile in accordance with at least one parameter from the obtained printing data, to produce a dry or semi-dry or partly-dried printed textile; and
- curing the dry or semi-dry or partly-dried printed textile.

In embodiments of the method, the curing the dry or semi-dry or partly-dried printed textile comprises using at least one parameter from the obtained printing data.

In embodiments of the method, the printing data comprises programming data of a batch of printing operations.

In embodiments of the method, the data comprises programming data of printing of an individual textile.

In embodiments of the method, the data comprises sensor data of a printer.

In embodiments of the method, the data comprises an indication of a density of pre-printing fluid applied to the printed textile.

In embodiments of the method, the data comprises an indication of an amount of ink applied to the printed textile.

In embodiments of the method, the data comprises an indication of a number of layers of ink applied to the printed textile.

In embodiments of the method, the data comprises an indication of a size of the printed textile.

In embodiments of the method, the data comprises an indication of a color of the printed textile prior to printing.

In embodiments of the method, wherein the data comprises an indication of colors printed onto the printed textile.

The method may comprise translating the data into a time required to operate the pre-curing to dry the garment.

The method may comprise translating the data into a temperature required to operate the pre-curing to dry the garment.

The method may comprise translating the data into a time required to carry out the curing.

The method may comprise translating the data into a temperature required to carry out the curing.

In embodiments of the method, hot air is provided for one or both of the pre-curing and the curing, the method comprising controlling a temperature for one or both of the pre-curing and curing by modulating an amount of the hot air.

In embodiments of the method, one or both of the pre-curing and the curing uses at least one heat emitter to emit heat, the method comprising controlling a temperature by controlling a parameter of the emitter.

In embodiments of the method, the emitter may be any of a microwave emitter, an infra-red emitter and a radio frequency emitter.

In embodiments of the method, the parameter is one member of the group consisting of: height of the emitter above the printed textile, power, time, width, and an on/off duty cycle.

The method may comprise applying softener to the printed garment after the pre-curing and prior to the curing.

The post printing method may comprise detecting a flatness of the printed textile to ascertain that it is safe to bring the printed textile into proximity with drying elements.

According to a third aspect of the present invention there is provided a post printing apparatus for drying and curing printed textiles, comprising:

A pre-curing section configured to heat a printed textile;

a second, curing, section configured to heat an at least partly dried textile from the first section; and a controller, configured to obtain data from at least one sensor on the post printing apparatus of the printed textile and to use the data to control at least one of timing, power and temperature of at least one of the first, pre-curing, section and the second, curing, section respectively.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

The patent or application file contains at least one drawing executed in color. Copies of this patent or patent application publication with color drawing(s) will be provided by the Office upon request and payment of the necessary fee.

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

DESCRIPTION OF SPECIFIC EMBODIMENTS OF THE INVENTION

Figure 1A:
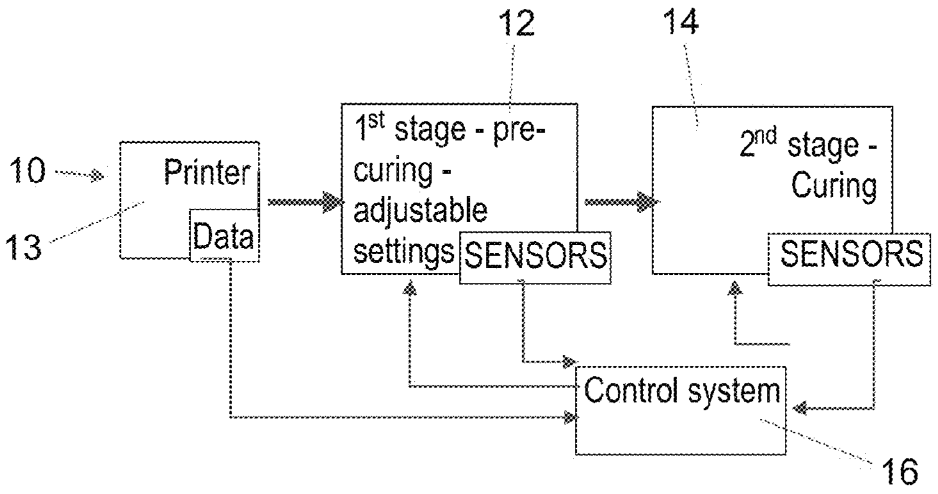
FIG. 1A is a simplified diagram of a post printing apparatus for drying and curing of textiles, according to embodiments of the present invention.

The present invention, in some embodiments thereof, relates to a post printing apparatus and method for textile printers and, more particularly, but not exclusively, to an apparatus that provides for drying, curing and like post-printing functions.

A post printing apparatus for drying and curing printed textiles, comprises a first section to dry a printed textile, a curing section to cure the dried textile from the first section, and a controller.

The controller obtains data of the printing of the printed textile and uses that data to control timing and/or temperature of one or both of the first section and the curing section. The apparatus may thus provide a customized post printing process for different kinds and colors of garments and the different printing processes that they may have undergone.

It is to be noted that the processes of “drying” and “curing” are not totally separated and the process of drying the ink may include also a partial process of curing the ink, meaning the chemical reaction of crosslinking the binder in the ink, and vice versa. The common feature of the drying and curing processes is the process of heating the printed garment or other substrate by hot air oven, IR or any other mean of heating.

The present embodiments may thus provide a system for drying and curing printed textile, which system may be constructed from two or more separate modules, which may share a common path and controls, including at least one module capable of drying fluids from the textile, and at least one module capable of curing the ink on the printed textile. Data and/or sensors from the printing process and/or from the drying process may feed the main control to provide optimized setting to the drying and curing modules, either offline and/or real time. The drying and curing apparatus may be part of attached to digital printers include direct to garment printers and roll to roll printers or a standalone apparatus.

The present embodiments are applicable to other printers with different technologies and different media, where drying of the medium and curing of the ink is required, including screen printers. Other media than textiles may include felts and anything else where absorption by the media means that wetting is useful to improve the quality of the ink.

Furthermore, regardless of the specific medium used, the present embodiments are applicable where the drying conditions vary due to change of the medium and/or print, and wherever there is a need not only to dry and evaporate the liquid but also to cure the ink. That is to say, any printer which is sufficiently general-purpose that it may print different substrates or print using different dyeing conditions, may usefully make use of the present embodiments.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring now to the drawings, FIGS. 1A-D illustrate post printing apparatus 10 for drying and curing printed textiles according to the present embodiments.

A first section 12 obtains a textile from a printing machine 13 and the textile is placed within so that the textile is dried (for example by IR, RF or MW radiation) to a certain percentage (e.g. to a stage at which 10% fluids remain on the media) for a certain time at a certain temperature and/or radiation power at a certain radiation distance and at a certain on/off duty cycle. In an embodiment, the textile may be placed within on a conveyor set at a given speed that defines the time within the first section.

A curing section 14 obtains the dried textile from the drying section and again holds the textile for a certain time, to cure the ink in the textile, and may dry remaining fluid.

A controller 16 obtains data associated with the printing operation that the textile has undergone and uses that data to control one or more of the drying and/or curing parameters such as timing, radiation, and temperature of either or both of the first section and the curing section.

The data may be programming data for a batch of printing operations. Such is useful if a batch of similar garments are printed together. Thus for example the batch of garments may all be light colored cotton garments which are printed all over, and that information may be used to set a relatively short drying time and/or other heating parameters since cotton does not require much pre-printing liquid. On the other hand the curing time may be longer than usual since the inks, although they are standard inks, are present in large quantity over the garment. It is noted that the use of a first section allows curing to be carried out on a dry or almost dry garment.

The data may include programming data for printing of an individual textile. The printer may be producing individual operations where there is very little relationship between the different shirts.

The data may include data from one or more sensors from the printing system, for example from loading, pretreatment, from the printer itself, and from unloading. Additional sensors may be placed in the post printing part to cover loading onto the post treatment conveyor, drying, and curing. Thus the printing system may obtain information such as thickness of the textile substrate, wetness, and the like, which may be useful for the controller.

The data may include an indication of a density of pre-printing fluid applied to the printed textile. For example, the liquid density may vary between say 10 gr/$m^2$ and 100 gr/$m^2$ for specific fabrics and garments.

The data may comprise an indication of an amount of ink applied to the printed textile, thus some garments may be printed all over, and some may have a very sparse design.

The data may comprise an indication of a number of layers of ink applied to the printed textile. Thus dark backgrounds may require a white undercoat before printing a color image. In such cases the amount of ink that needs to be cured is increased, and the amount of drying energy may be greater as well.

The data may comprise an indication of a type and size of the printed textile. Such an indication may be useful if the textile is a garment, since smaller garments require less drying and have less ink to be cured.

The data may include an indication of a color of the printed textile prior to printing, which in turn may be indicative of the amount or number of layers of ink that have been applied.

The data may include an indication of colors or types of inks printed onto said printed textile. Again, this may be useful to know the amount of curing energy that will be necessary.

The controller may operate to translate the data received into a time required to operate the first section to dry said garment. In turn the time required may be translated into a speed of a conveyor carrying the garment through the first section.

The controller may translate the data into the set of parameters required to operate the first section to at least partly dry the garment. These parameters may include the radiation energy, wavelength, distance from the substrate, on/off duty cycle, and more. Thus the wetter the garment or the larger the print the longer the time that may be needed and/or the higher the output energy required in the first section to at least partly dry the garment. In addition, the type of textile substrate may be considered. Certain types of textile are more sensitive as mentioned above, and thus a lower temperature and/or lower output energy for a longer time may be preferred over a shorter time and a higher temperature or energy.

Likewise, the controller may translate the data about the printing into a time, a temperature or a time temperature combination to operate the curing section to carry out curing of the inks. The textile or garment is expected to be at least 30% dry when arriving at the curing section so that the amount and type of ink are the principal variables to be considered.

The data may include an onboard sensor indication of the actual humidity (concentration of fluids) of the printed textile following the printing phase, which may be indicative of the amount of the drying energy (e.g., radiation power, distance of the emitters from the substance, etc.) that has to be applied in the first phase.

The data may include an onboard sensor indication of the actual position of the fluids on the garment on the printed textile following the printing phase, which may be indicative of the operation of the drying energy (e.g., on/off duty cycle of the emitters) that has to be applied in the first phase.

The data may include an onboard sensor indication of the actual humidity (concentration of fluids and drying percentage) of the printed textile following the drying (pre-curing) phase, which may be indicative of the amount of the curing energy (e.g., hot air temperature, air flow rate, etc.) that has to be applied in the curing phase.

The post-printing apparatus, which is typically principally a drier, may have one of three configurations in respect of the way in which it is connected to printers. A first configuration is the one-to-one configuration, an integrated system with the printer, wherein the printer feeds data from its database and job records to the dryer in order to set its drying parameters specifically for each shirt. A second configuration is one-to-many, in which one dryer serves multiple predefined printers—e.g., three known printers; wherein the dryer needs to allocate the origin of the shirt and then receive its data from that specific printer. A third configuration is also one-to-many but is the case in which there is no prior allocation, so shirts from any printer can be dried. The drier knows nothing about the printer, and thus cannot receive data therefrom, so that the dryer must learn all data from the printed shirt itself.

Figure 1B:
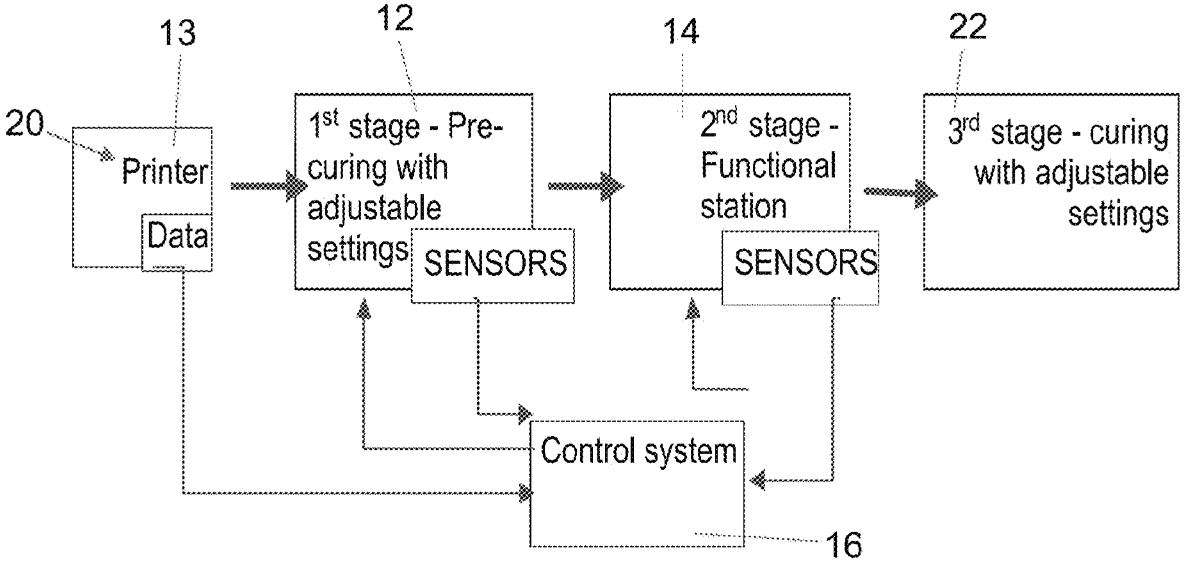
FIG. 1B is a modification of the embodiment of FIG. 1A with an intermediate station added.

Reference is now made to FIG. 1B, which illustrates an embodiment 20 of a post printing apparatus. Embodiment 20 is similar to that shown in FIG. 1A and has an identical first section 12 and curing section 14, but in between the first section and the curing sections there is provided an additional station 22, which carries out functions that may suitably be applied to the at least partly dried textile prior to curing, such as fabric softening. Fabric softening requires the addition of further liquid to the printed textile, which may reduce print quality if attempted prior to at least partly drying. On the other hand, if the softener is added after curing, an additional drying stage may be required, and accordingly in the prior art where drying and curing are combined, there is no really suitable stage for adding softener.

Figure 1C:
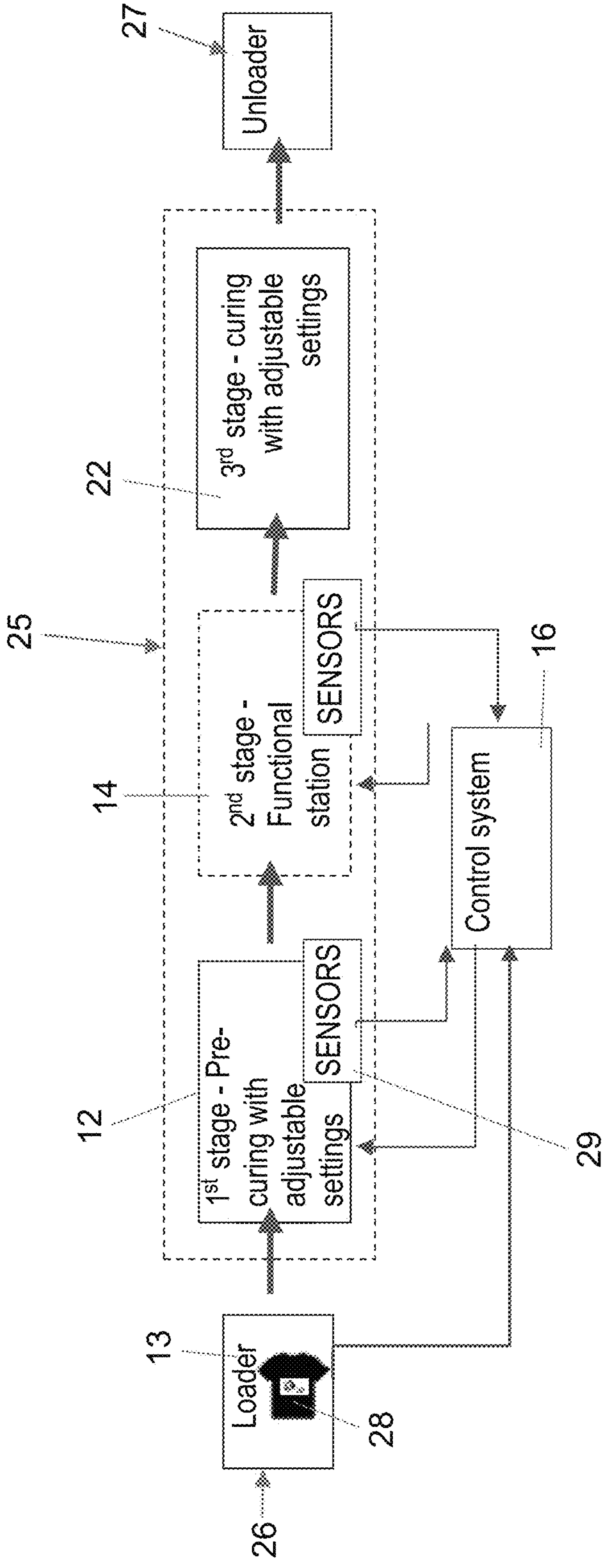
FIG. 1C is a simplified diagram of the post printing apparatus of FIG. 1B shown in greater detail.
Figure 1D:
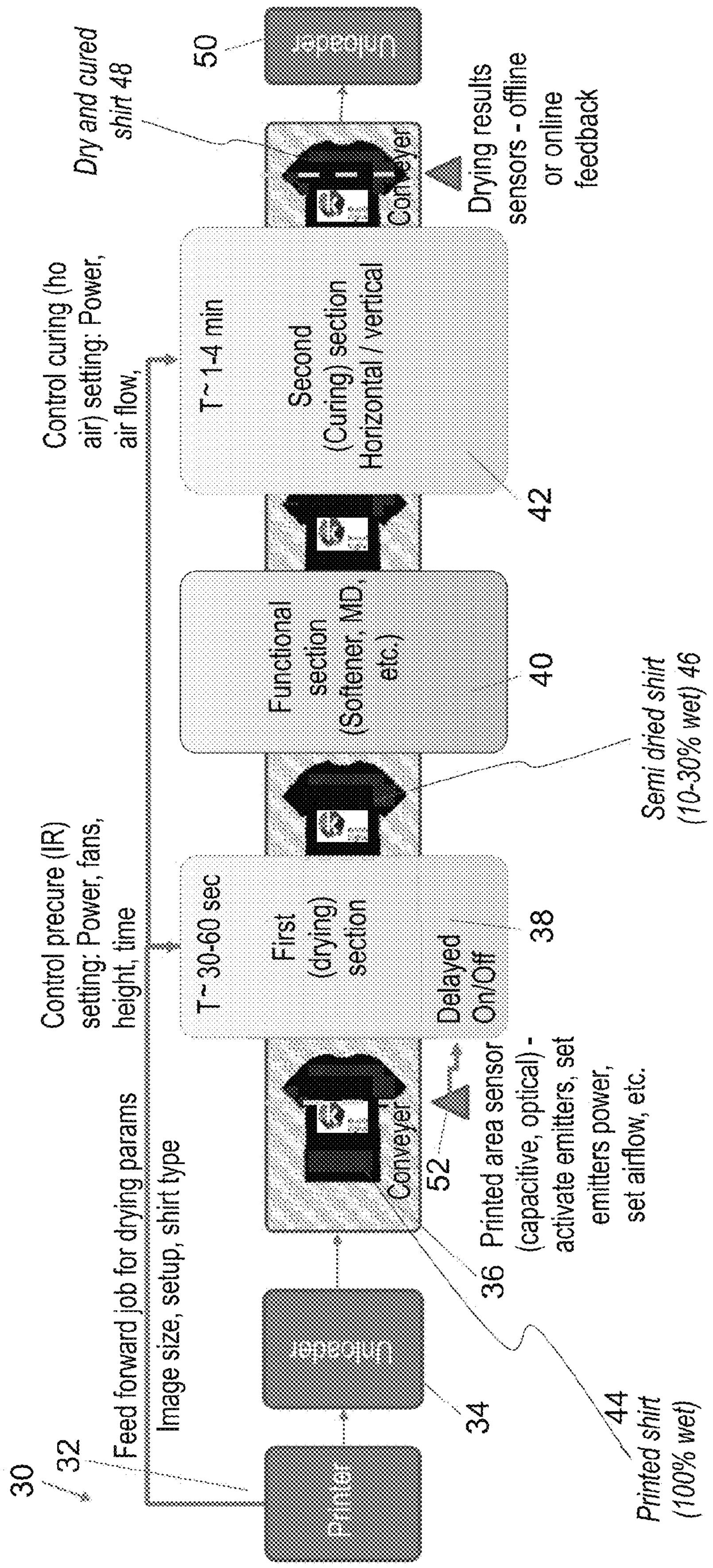
FIG. 1D is a modification of the embodiment of FIG. 1B, in which the post printing apparatus is controlled based on sensors on the post printing apparatus itself, but uses information fed forward from the printer and which thus may be suitable for embedding with a single printer.

Reference is now made to FIG. 1C, which illustrates a further embodiment 25 of a post printing apparatus according to the present invention. In the configuration of FIG. 1D, the apparatus is not associated with specific textile printers, but rather designed as a standalone system, and may be loaded with garments-manually or automatically-which are placed on conveyor 36 and which runs through the various post printing stages. In lower throughput settings, it may be acceptable to manually load the post printing apparatus. As discussed, the apparatus is a multiple stage system having two or more stages, such as pre-curing module 12, functional module 14 and curing module 22. The system may have adjustable drying parameters, including for example temperature, airflow, emitters energy level, and duratin of the garment in the module which may be set by feedback from the system's onboard sensors, and there may be additional stages of chemical curing and other functional stations.

As explained, there may be feedback of data from the apparatus itself, which is used to set the parameters for pre-curing or drying and curing. The settings may support multiple substrate and printing options such as size or width of the fabric, humidity of the printed garment, actual position of the printed image, etc. A printed but still wet shirt enters the apparatus from the printer end, a dry or partially-dry shirt emerges from the pre-curing module 12. For example the shirt entering the curing section may be 10-30% wet. Subsequently, a dried and cured shirt emerges from the curing module 22. A manual or automatic unloader 27 may remove the cured and dried textiles.

Closed loop data may be used. For example, internal sensors may obtain textile weights, sizes, or humidity or temperature within the module and adjust times, emitters, or temperature accordingly, or in some cases control safety measures to override or halt the process.

The closed loop variant thus allows for a stand-alone dryer, as will be discussed in greater detail below. The internal sensors of the dryer may include a camera and image processor, an IR camera to detect the temperature difference between the wet (that is printed) and dry portions of the current garment, and an analog capacitive sensor.

The camera and image processor may be used to recognize the garment by its shape, colors, size, etc., and thus determine the source printer.

The IR (heat sensitive) camera may, as stated, sense temperature differences between the dry and the wet portions on a shirt.

The analog capacitive sensor may sense the amount of fluids on the shirts, thus allowing for drying and curing times and temperatures to be determined.

A laser height sensor may be used to measure the thickness of the shirt and determine the fiber type, again to determine suitable times and temperatures.

For an open loop variant, the printed textile may include data storage devices such as RFID tags, QR or barcode tags 28, that have been prewritten with relevant print attributes from the printer, which may be read by a reader in the pre-curing module 29 and used as a feedforward data for setting up the drying and curing system individually for each specific garment.

The data obtained may be used to set different parameters for heat emitters. The emitters may be microwave, infra-red or even radio-frequency emitters. The parameters for the emitters may include height of the emitter in the module, power, time, width, and an on/off duty cycle, in real time.

Reference is now made to FIG. 1D, which illustrates a further embodiment 30 of post printing apparatus according to the present invention. The apparatus is associated with one or more textile printers, indicated generally as printer 32, and may be loaded directly from the printers using an automatic unloader 34, to conveyor 36 which runs through the various post printing stages. Full automation is especially useful in high-throughput factory settings. In lower throughput settings, it may be acceptable to manually load the post printing apparatus. As discussed, the apparatus is a multiple stage system having two or more stages, such as first section 38, functional section 40 and curing section 42. The system may have adjustable drying parameters, including for example temperature, air-flow and duration of the garment in the section, as indicated at the top of the respective section in the figure, which may be set by feed forward from the printer or feedback from sensors, and there may be additional stages of chemical curing and other functional stations. Other functions may include ironing.

As explained, there may be feedforward of data from the printer to the post printing apparatus, which data is used to set the parameters for drying and curing. The use of data fed forward from the printer makes the dryer particularly suitable for embedded use with a single printer. In the case of a single printer, the data coming from the printer may be matched with the arriving shirt. The settings may support multiple substrate options such as printer input options, for example fabric type, fabric thickness, base color of the fabric, and size or width of the fabric. Also supported may be attributes that come from the printing process itself such as amount of pre-treatment fluids, types of inks, colors and extent of the print etc. A printed but still wet shirt 44 enters the apparatus from the printer end, a dry or semi-dry shirt 46 emerges from the first section 38. For example shirt 46 may be 10-30% wet, and a dried and cured shirt 48 emerges from the curing section 42. An unloader 50 may remove the cured and dried textiles.

In addition to parameters from the printer and as partially discussed above, closed loop data may be used. For example internal sensors may obtain textile weights, sizes, or humidity or temperature within the section and adjust times, energy output, or temperature accordingly, or in some cases control safety measures to override or halt the process. In addition printer and job data from the printer and/or database may be used to provide presets. The textile may include RFID tags which may be interrogated and operator inputs may be provided.

The data obtained may be used to set heating parameters for heat emitters. The emitters may be microwave, infra-red or even radio-frequency emitters. The parameters for the emitters may include height of the emitter in the section, power, time, width, and an on/off duty cycle, in real time.

The controller may be physically located onboard of the platform or printer, or may be standalone.

A hybrid system may be provided in which a separate system provides hot air for the various sections. The controller may modulate the amount of hot air in order to control the temperature, or alternatively the hot air may provide a base level of heating and emitters may be controllable to provide a desired temperature above the base level.

In one embodiment, the emitter and the first section may be integral with the printer.

In one embodiment, the pre-curing module, the intermediate functional module and the curing module may be configured as a standalone system without integration to a specific printer. In this configuration the system comprises one or more onboard sensors to define the different drying and curing parameters by internal means as feedback, and without the need for feedforwarding data from the printer itself.

The ability to customize the post-printing process may reduce the costs of operation of the overall printing process, as the overall power consumption and footprint of the post processing may be reduced.

Safety features may be included such as overheating detection, immediate turn-off, etc.

As discussed in respect of FIG. 1B, additional functional stations may be embedded for other required post printing stages, such as fabric softening.—The addition of softener may be advantageous due to the fact that the fabric may be accessed in a dry or nearly dry state. That is to say if additional liquid such as softener on a wet printed substrate may damage the print, on the other hand to add this liquid after the final drying and curing will be inefficient because another stage of drying may be needed.

Whereas in the current art, both the drying and the curing phases are performed together in the same physical system, which is typically a long hot air section, in the present embodiments the first phase is performed by one subsystem, mainly responsible for the drying phase, which can be adjusted to any specific attribute of the substrate and the printer laydown, and the second phase is performed by a separate subsystem, mainly responsible for the curing phase also with adjustable parameters, such as temperature, output power, distance, time etc. This arrangement enables full flexibility in defining the drying parameters for each print and allowing for separate and distinct drying and curing parameters. Furthermore, since the system is in at least two parts, one for drying and one for curing, the time lag for applying new settings is less, and is further mitigated by an ability to provide the printing data in advance of the arrival of the textile. That is to say, the controller receives feedforward data, for example in advance of drying given textiles. Data from the printer about the current textile being printed is fed forward to the post printing controller prior to arrival of the respective textile, and thus the print attributes arrive automatically from the printer to the drying system before the current textile. The controller, in turn, may use these attributes to set the specific parameters of the drying system for optimizing the drying of the current textile when it arrives.

In addition, sensors, such as printed area sensor 52, may be located in the drying path and may measure and monitor the actual conditions of the garment and either confirm or modify inputs from the printer or provide additional inputs to further optimize the drying parameters.

The adjustability of the system according to the present embodiments may optimize the drying process, and accordingly reduce the overall drying time as well as power consumption, support different substrates, etc.

The first stage, the pre-cure section or dryer may be constructed of any technology that can evaporate enough fluids in the given time and may be controlled rapidly and remotely. For example, a microwave section, or a section with IR emitters, or RF emitter, etc. may be used.

The adjustable and controlled parameters may include the following options (or any subset of them):

Emitter power which may be set according to the amount of fluid in the garment or textile (0-100% of a preset maximum power);

Emitter exposure time according to the garment or textile type;

An ON/OFF duty cycle which may be set according to the print area;

A setting to change heat source height from the garment may be used. Etc.

The parameters may be altered either by pre-defined "presets", say from a database or look up table, or dynamically by the system according to the specific attributed as derived (and fed) from the printer's setup, including the following.

Garment (shirt) type—fabric (cotton, synthetic, etc.), shape (tee-shirt, jeans, hoodie, etc.)

Garment width (in mm)

Garment color (white, dark)

Amount of fluids (pretreatment and ink laydown) on the shirt (grams) Etc.

The following table shows a general relationship between data sources, attributes and optional settings at the different stages.

TABLE 1

Relationship between data sources, monitored attributes and sensors

| Stage | Data source/Sensor | Monitored attributes | Optional settings for current or next stage |
|---|---|---|---|
| Database | Media data | Width, material | Drying power, emitters height, drying time |
| Printer | Job instructions | Pretreatment, amount of fluids, image location | Drying power, emitters height, drying time |
| Dryer (each stage) | Humidity, temperature, IR radiation, laser beam, QR/barcode/RFID with data | Fluid density on garment, print location, internal temperature | Start/stop power, set air flow, emergency stop (overheating) |
| Post drying | Camera, humidity, manual QC | Print quality, garment weight, garment conditions | Adjust power/height/air-flow |

One way of using the apparatus comprises using the first section to align all the printed textiles to the same amount of liquid per area before entering into the curing section where a hot air drier is at a fixed setting, so the end result of drying and curing is the same, regardless of the pretreatment and/or ink laydown. In this way, the hot air drier may be set to a single most efficient setup with most of the adjustment being at the first section.

Safety

High energy emitters may introduce certain safety issues due to the heat source being adjacent to the fabrics. These issues are even more important when working in an automated system where the garments are moved between the different stations using automatic systems and thus enhance the probability for faulty placement of the garments in the dryer. Thus robot-type loaders and unloaders may not notice if garments not placed flat on the conveyor, hence risking direct contact between the garment and the heat emitter.

The present embodiments may include features to prevent such a risk from arising.

One solution is to use a laser curtain that acts as a wrinkle or fold or flatness detector to detect the garment's height and distance from the heat source, and may automatically adjust the power and/or the height accordingly, and in extreme cases bring about complete shutdown of the system.

A humidity sensor, for example a capacitive sensor, may sense the humidity level on the shirt and adjust the parameters such as power and height, etc.

A sensor, which may be the same as the capacitive sensor above, may sense the presence of fluids on the substrate and turn the system on specifically over wet locations where extra drying is needed, or conversely, may turn the system off over the same wet locations if some danger is anticipated.

There are various ways in which the present embodiments may be used. Production system based on conveyers in line with a printer or group of printers may operate using any of the following options:

- Fixed settings for all options of shirts, and setups for large batches with the same basic attributes;
- Limited adaptive setup based on presets for each shirt type as fed from the printer; and
- Full adaptive setup for each shirt based on print attributes and internal sensors—complete system.

The different options may be provided ab initio, or may be selected based on the way the printers are being used. Often in factories large batches of similar tasks are carried out together, whereas print on demand systems may favor the full adaptive option.

Figure 2A:
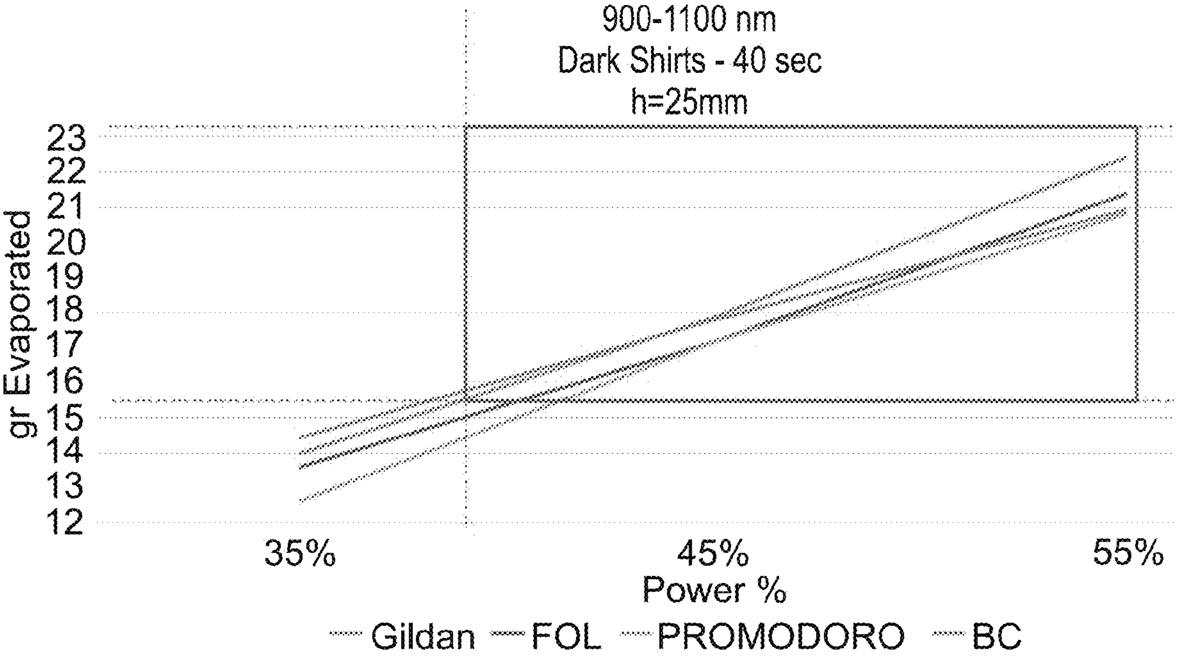
FIGS. 2A and 2B are two graphs of evaporation rates from wet garments using a first section according to embodiments of the present invention.

The adaptive post printing apparatus may enable full control over the settings of the various subsystems and modules in order to achieve optimized settings for each printed garment, or batch of garments, and such optimization may contribute to the sustainability and environmental attributes of the drying process due to:

- Smaller overall system, footprint reduction.
- Smaller power consumption
- Reduced carbon footprint due to lower power consumption and air flow Reference is now made to FIG. 2A, which illustrates percentage of water evaporated against power for four different shirts dried under different conditions. Drying time was 40 seconds for all shirts, height of the emitter over the shirt varied between 25 and 60 mm and the power varied between 50 and 90% of maximum output.

Figure 2B:
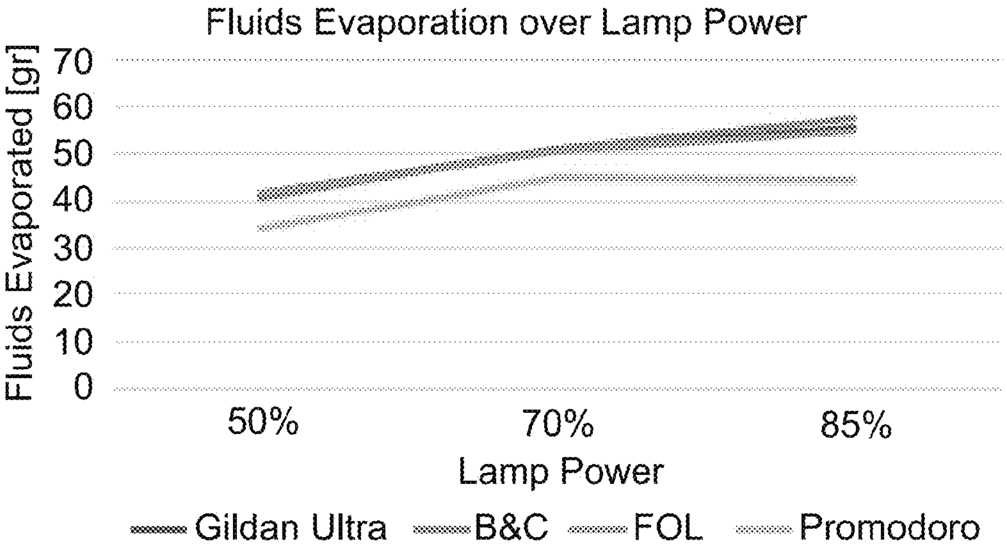

FIG. 2B is a graph showing evaporation due to an Infra Red lamp on four different shirts. The lamp is used at 50%, 70% and 85% power.

Figure 3:
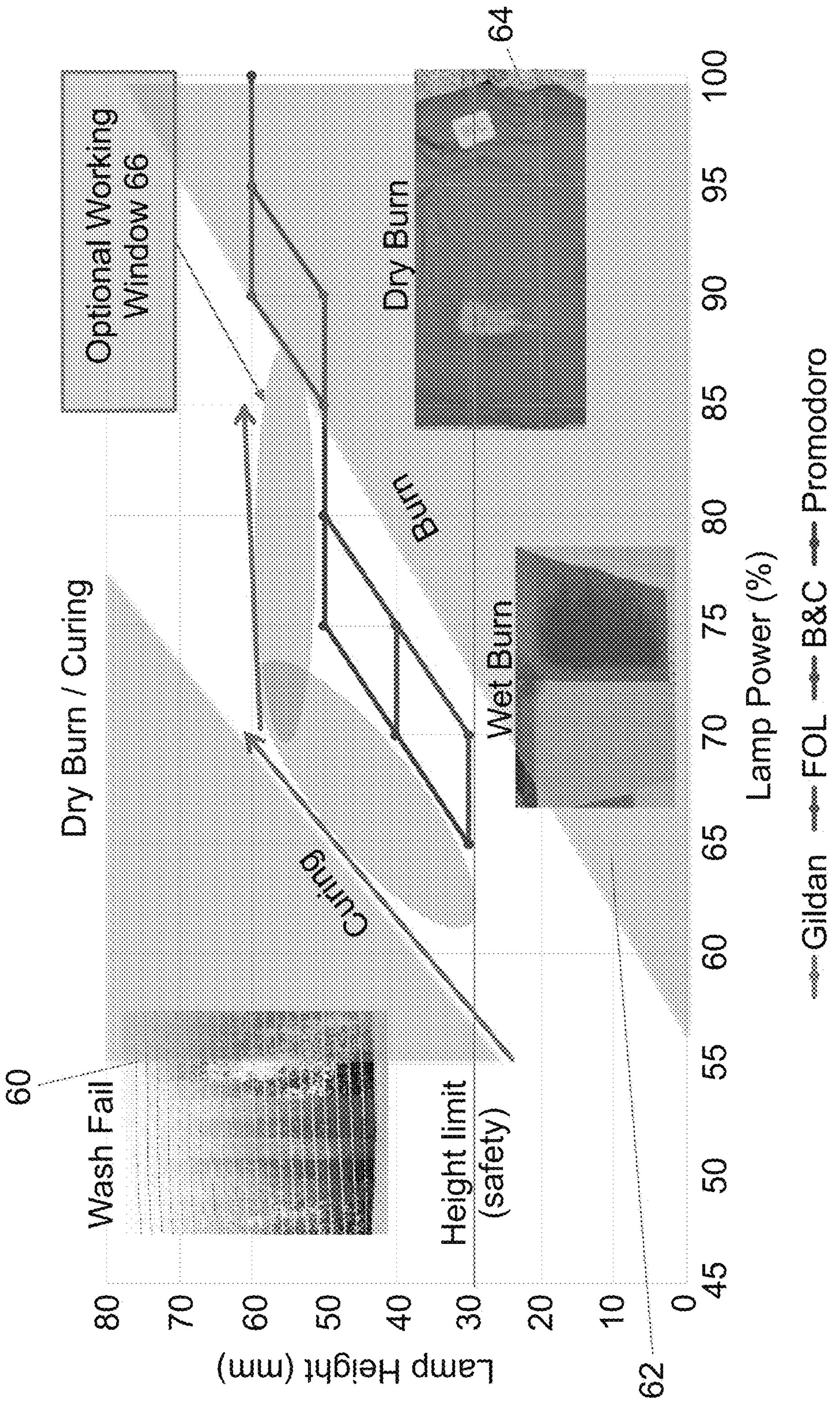
FIG. 3 is a simplified graph showing safe and unsafe operating parameters for curing according to embodiments of the present invention.

FIG. 3 is a graph showing safe use of an infra-red lamp for curing, again on four different shirts. The height of the lamp from the shirts is on the vertical axis and the power of the lamp on the horizontal axis. Too low a power causes a wash fail, region 60. A combination of medium power and low height—region 62 - causes a wet burn. High power and low height causes a dry burn—region 64, and the intermediate region 66 provides curing in an optional working window.

Figure 4:
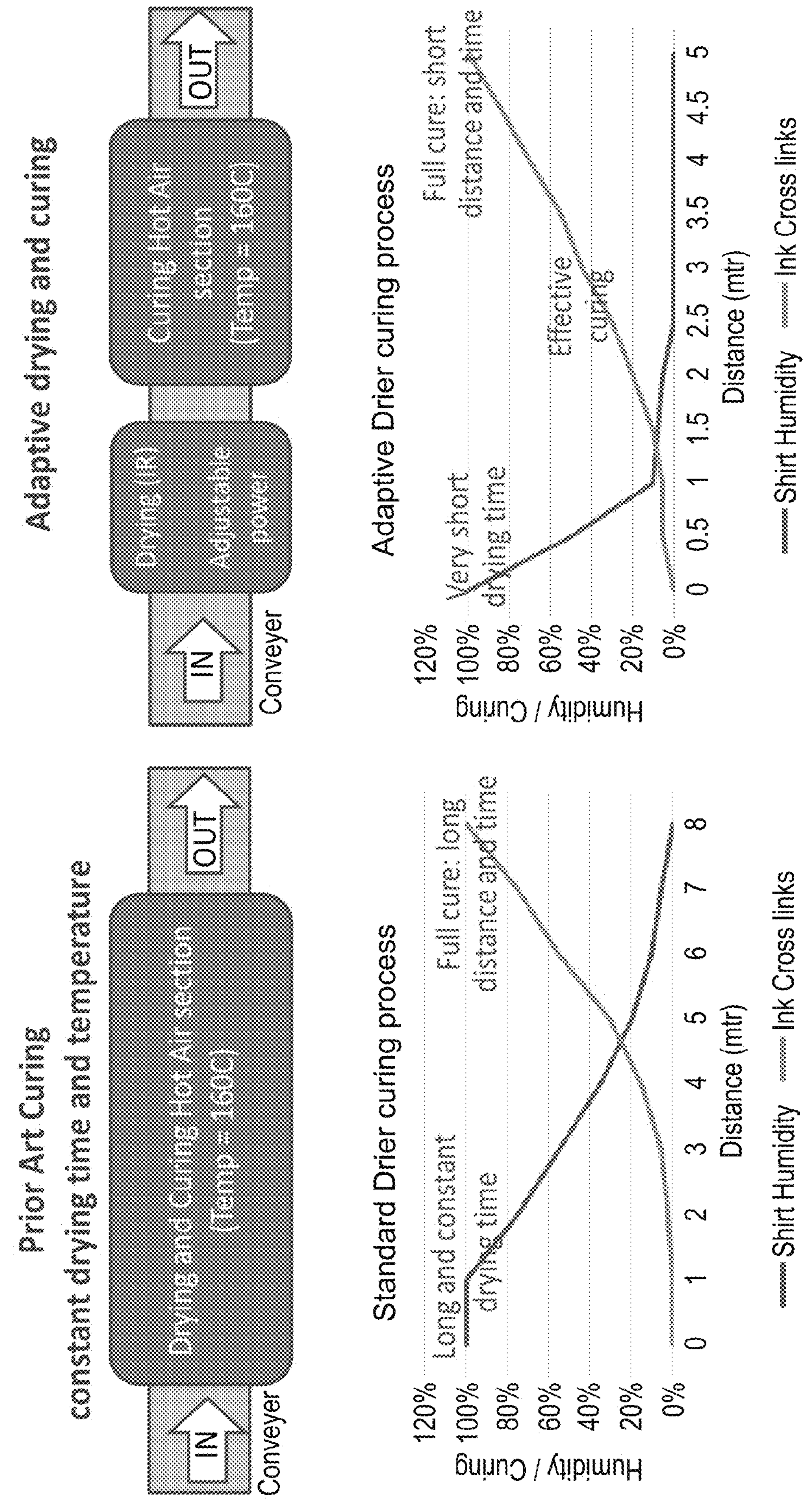
FIG. 4 is a comparison of the combined drying and curing processes of the present embodiments and the prior art.

Reference is now made to FIG. 4, which illustrates a comparison between prior art curing and adaptive drying curing according to the present embodiments.

The prior art system uses a single section for drying and curing in hot air, typically at a temperature of 160° C. for a fixed time. The result is a long and constant drying time and a curing process which takes up the distance of the section but only starts several meters into the section due to the garment still being too wet.

By contrast the system of the present embodiments is able to use a shorter drying time since the drying parameters may be customized for the current case, and curing takes a shorter distance overall since the whole of the curing section is able to carry out effective curing.

Figure 5:
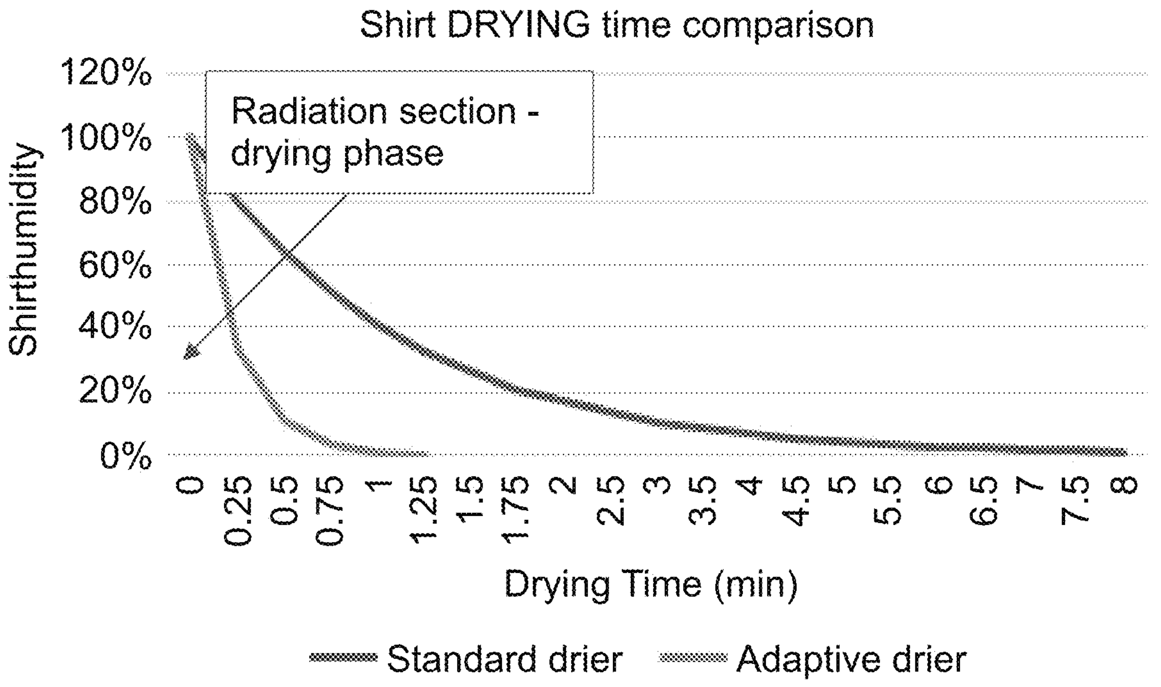
FIG. 5 is a simplified diagram showing a comparison of drying and curing times between the present invention and the prior art.
Figure 5:
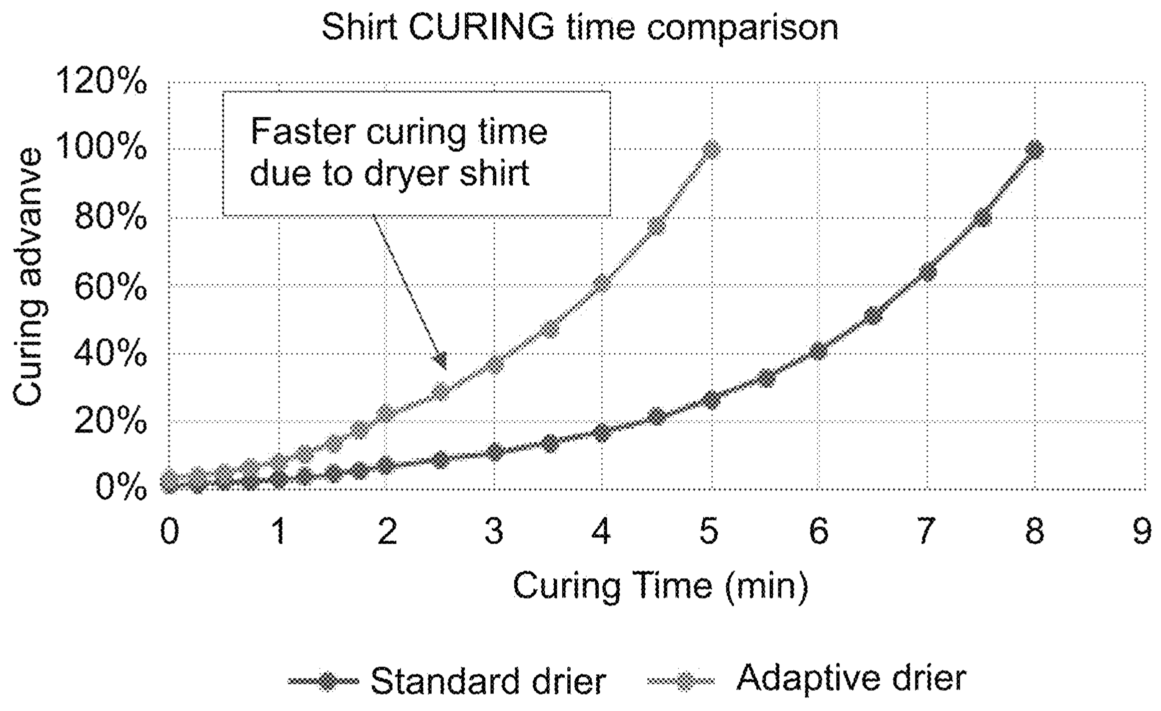

Reference is now made to FIG. 5 which shows comparisons of drying and curing times according to the prior art and to the present embodiments. Both the drying times and the curing times are individually shorter in the present embodiments compared to the prior art.

Figure 6:
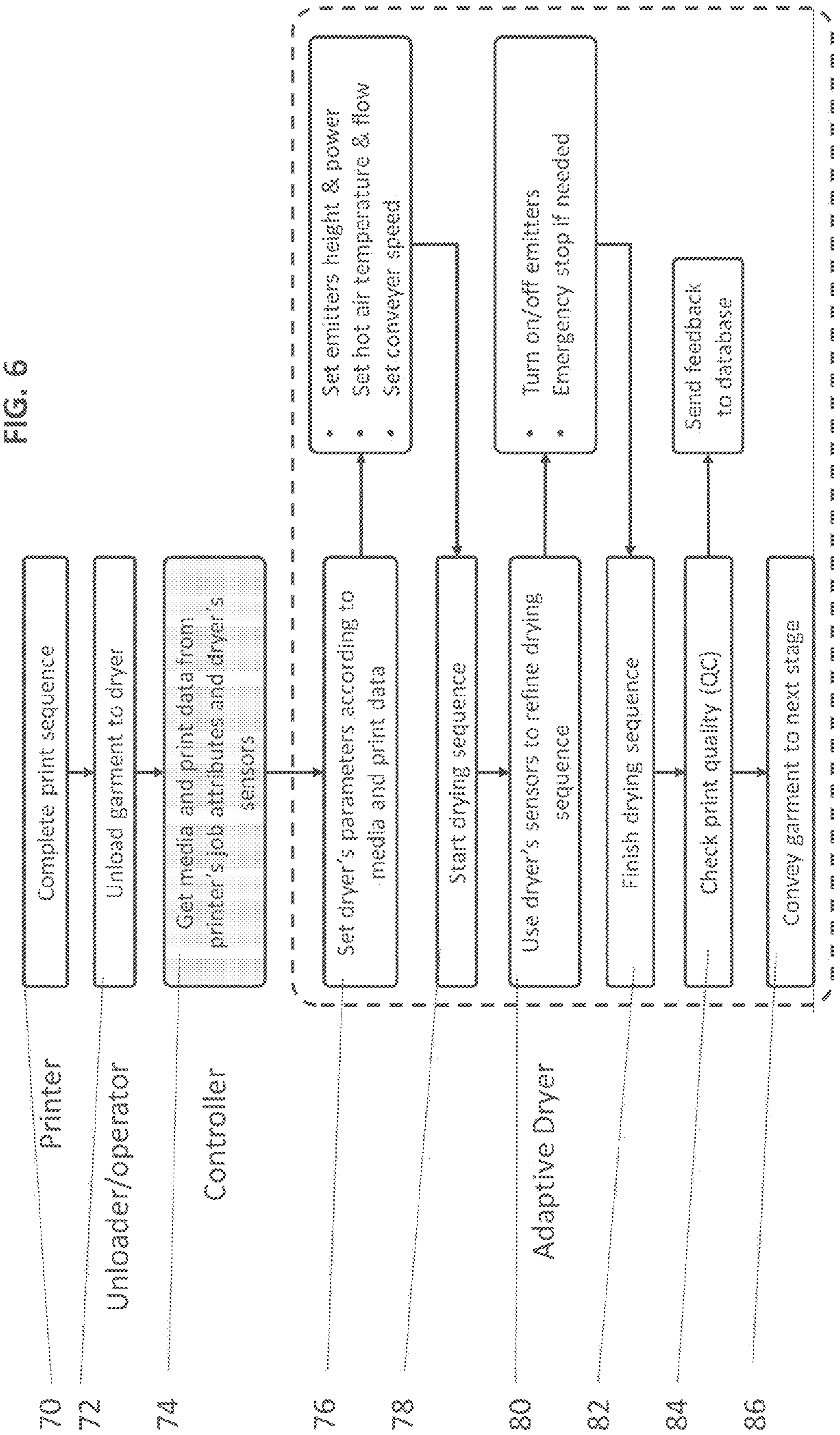
FIG. 6 is a simplified flow chart illustrating operation for a dryer which is connected to or embedded with a single printer, such as FIG. 1D, according to embodiments of the present invention.

FIG. 6 is a simplified flow chart illustrating operation for a dryer which is connected to or embedded with a single printer, such as FIG. 1D, according to embodiments of the present invention. In the case of a single printer the print source is clear, and as long as the order of the garments into the dryer is the same as the order of the garments out of the printer, the data from the printer may be matched to the correct garment. Thus, in box 70, the printer completes a print sequence. In 72, a garment is unloaded to the post-printing apparatus, essentially the dryer. In 74, the dryer obtains data from the printer, including job attributes, and the data obtained is combined with data sensed from measurements taken at the dryer.

In box 76, the dryer's parameters are set according to the media and print data obtained. In 78 the drying and curing sequence is started using the parameters, and heat emitters, hot air temperatures and conveyer speed are all set accordingly.

In box 80, the dryer's sensors are all set to refine the drying sequence, say by turning the emitters on and off as appropriate, and even using an emergency stop, say if the garment gets too hot. In box 82 the sequence is completed. In box 84, more measurements are taken to ensure the quality of the result, and feedback may be sent, say to a database. In box 86 the garment exits the dryer and may be conveyed to the following stage.

Figure 7:
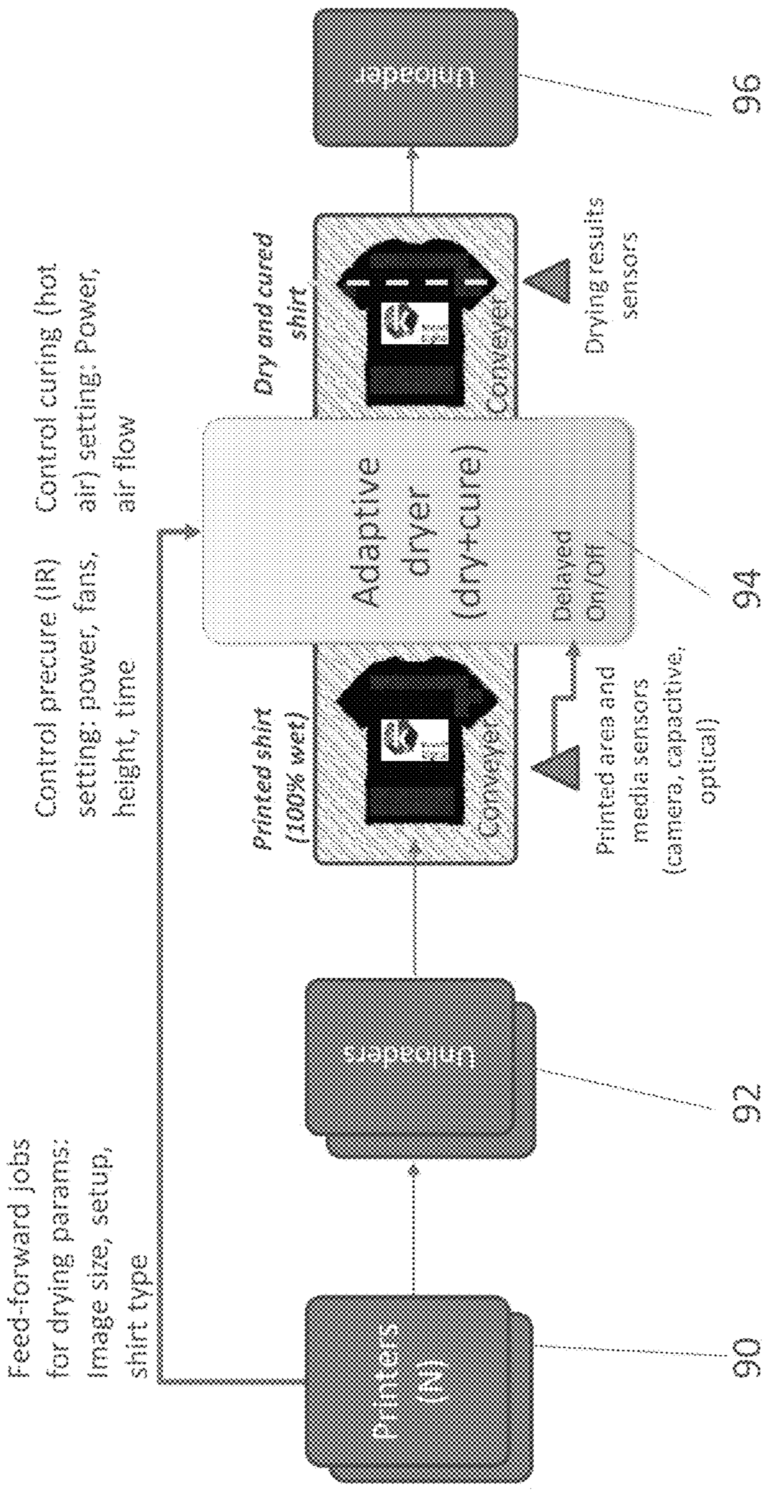
FIG. 7 is a simplified block diagram illustrating a dryer modified for serving multiple printers according to embodiments of the present invention.

FIG. 7 is a simplified block diagram illustrating a dryer modified for serving multiple printers according to embodiments of the present invention. In the case of FIG. 7 there is a guaranteed path from each printer 90 and thus, again, it is possible to match data from the printers with the garments as they arrive at unloader 92. The guaranteed path case is generally provided by automatic loading. Manual loading tends to be random and thus the embodiment is less suitable for manual loading. Feed forward information from the printer may thus be combined with measurements taken at the dryer 94 as in FIG. 6, which again is able to use two sources of information, its own measurements and the feedforward data to set the parameters for drying and curing. Following the drying and curing process the garment proceeds to unloader 96.

Figure 8:
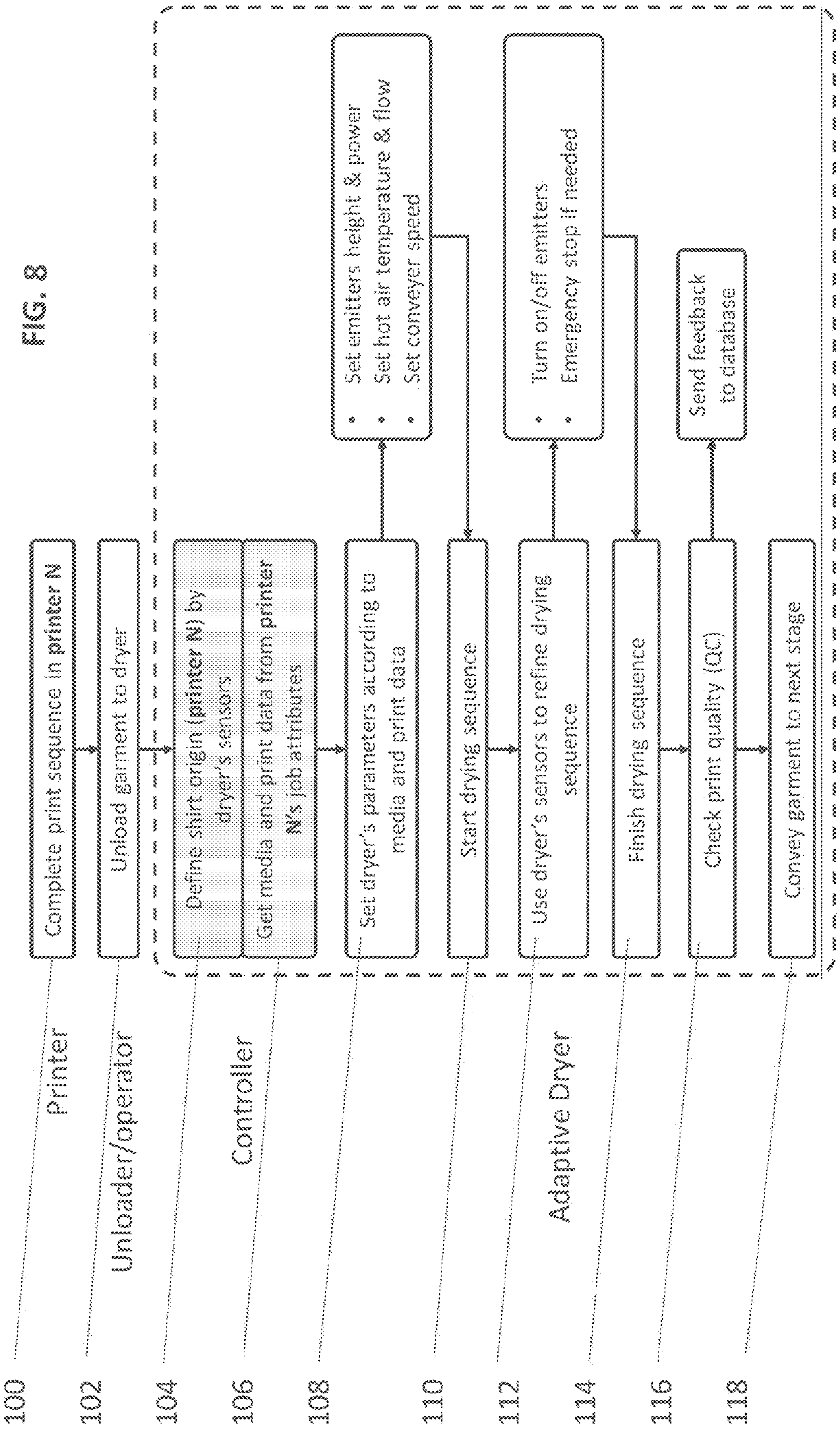
FIG. 8 is a simplified flow chart illustrating a process for operating a printer that serves multiple printers such as that of FIG. 7.

FIG. 8 is a simplified flow chart illustrating a process for operating a printer that serves multiple printers with guaranteed paths for garments from each printers, such as that of FIG. 7. Thus, in box 100, each one of the N printers connected completes a print sequence. In 102, a garment from printer N is unloaded to the post-printing apparatus, essentially the dryer. In box 104 the dryer senses information from the garment, such as the image that has been printed on it, in order to determine which is the printer N that is the source of the garment. In 106, the dryer obtains data from printer N, including job attributes, and the data obtained is combined with data sensed from measurements taken at the dryer.

In box 108, the dryer's parameters are set according to the media and print data obtained. In 110 the drying and curing sequence is started using the parameters, and heat emitters, hot air temperatures and conveyer speed are all set accordingly.

In box 112, the dryer's sensors are all set to refine the drying sequence, say by turning the emitters on and off as appropriate, and even using an emergency stop, say if the garment gets too hot. In box 114 the sequence is completed. In box 116, more measurements are taken to ensure the quality of the result, and feedback may be sent, say to a database. In box 118 the garment exits the dryer and may be conveyed to the following stage.

Figure 9:
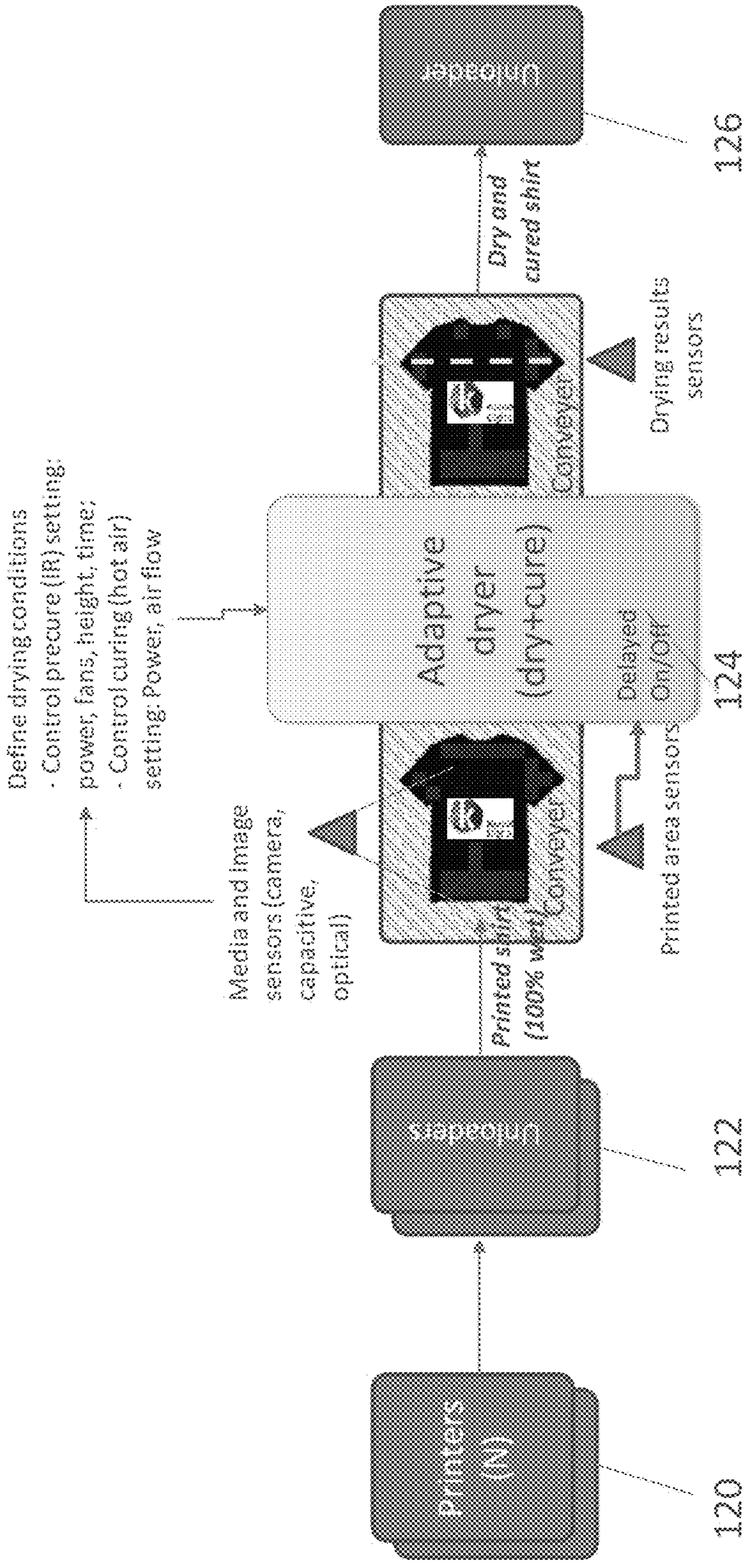
FIG. 9 is a simplified block diagram illustrating a second embodiment of a dryer modified for serving multiple printers according to embodiments of the present invention.

FIG. 9 is a simplified block diagram illustrating a second embodiment of a dryer modified for serving multiple printers according to embodiments of the present invention. In the embodiment of FIG. 9, manual loading is allowed, and thus there is no guaranteed path of the garment to the printer. Accordingly there is no automatic way to match the garment and the source printer. Thus any data from the printer is difficult to reliably match with an incoming shirt, and there is no guarantee that all the printers produce data, or that all the printers are even digital printers.

Accordingly, in the embodiment of FIG. 9, data required for drying and other post-printing operations may principally come from the garments themselves, and the post-printing apparatus may follow a stand-alone or autonomous model. An undefined group of N printers 120 may send garments to unloader 122 for the dryer 124. The stand-alone dryer relies on internal sensors that measure the incoming garments themselves, and the sensors may be able to determine which printer the garment has come from, or may try to determine the necessary drying and curing parameters. If the sensors manage to identify the printer and the order of the garment in the printer output then data from the printer may be used, if available. For example, a camera may be used to identify the image on the garment and match the image with current print files. In some cases, however, some of the printers on line may not produce data, or may not even be digital printers, so that identifying the source printer is of no value. Thus either or both of printer data and measurements taken at the dryer are used to set the parameters to adapt the dryer to the garment, and the dried and cured garment then proceeds to unloader 26.

Figure 10:
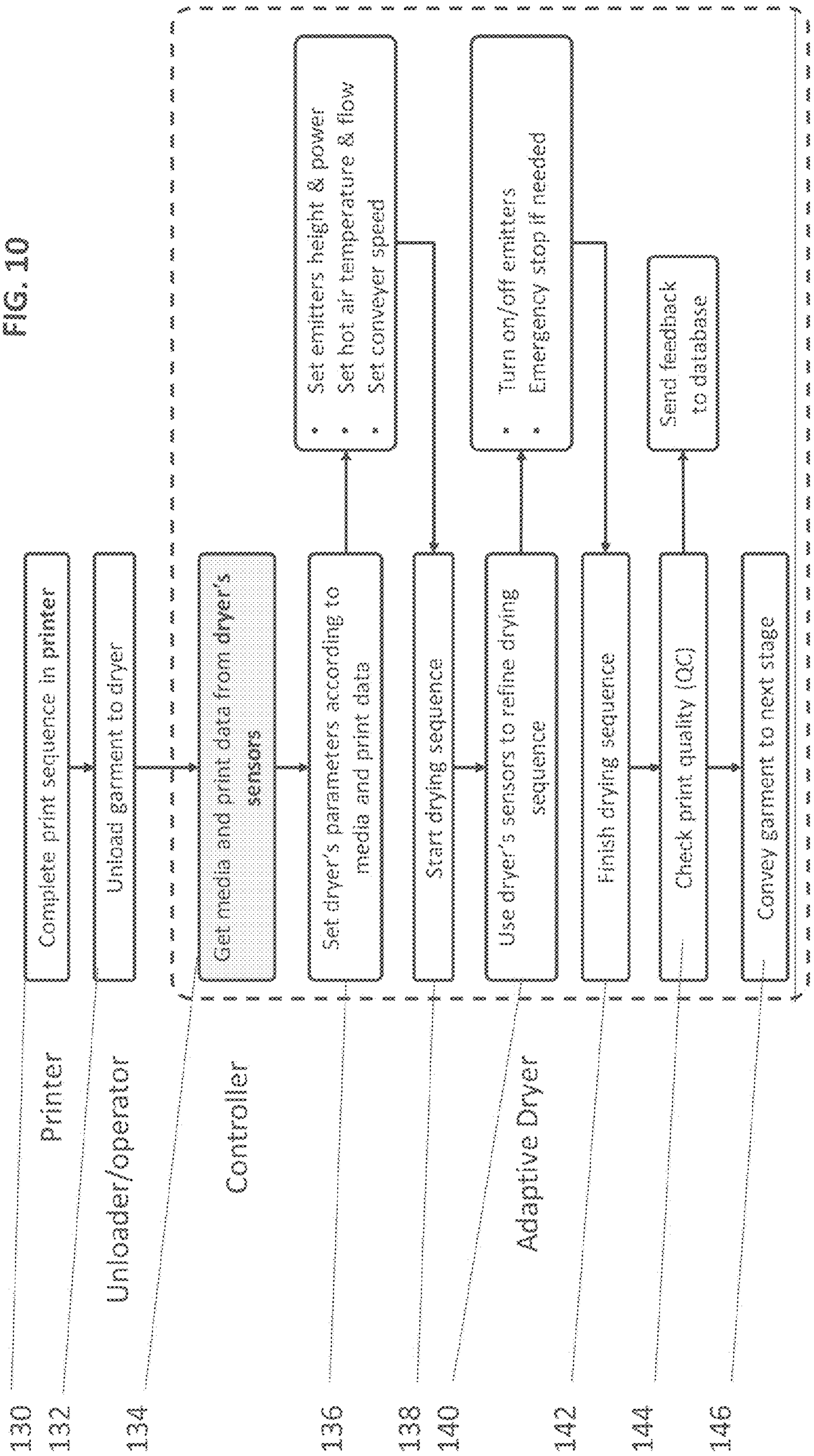
FIG. 10 is a simplified flow chart illustrating a process for operating a dryer that is standalone, and receives garments from different printers, sporadically or randomly, according to an embodiment of the present invention.

FIG. 10 is a simplified flow chart illustrating a process for operating a dryer that is standalone, and receives garments from different printers, sporadically or randomly, according to the embodiment of FIG. 9. Thus, in box 120, each one of the printers connected completes a print sequence. In 132, a garment from printer N is unloaded to the post-printing apparatus, essentially the dryer, but there is no information as to which printer is the source. In box 134 the dryer senses information from the garment, such as the image that has been printed on it, in order to determine which is the printer N that is the source of the garment, and also measurements say of degrees of wetness in the garment and measurements indicating the material used. The dryer obtains data from printer N if known and available, including job attributes, but principally may use data sensed from measurements taken of the media at the dryer.

In box 136, the dryer's parameters are set according to the media and print data obtained. In 138 the drying and curing sequence is started using the parameters, and heat emitters, hot air temperatures and conveyer speed are all set accordingly.

In box 140, the dryer's sensors are all set to refine the drying sequence, say by turning the emitters on and off as appropriate, and even using an emergency stop, say if the garment gets too hot. In box 142 the sequence is completed. In box 144, more measurements are taken to ensure the quality of the result, and feedback may be sent, say to a database. In box 146 the garment exits the dryer and may be conveyed to the following stage.

It is expected that during the life of a patent maturing from this application many relevant digital and other textile printing, drying and curing technologies as well as feed forward and feedback technologies will be developed and the scopes of these and other technological terms are intended to include all such new technologies a priori.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise. Throughout this application, various embodiments of this invention may be presented in a range format. It should be understood that the description in range format is merely for It is appreciated that certain features of the invention, which are, for clarity, described in the context of separate embodiments, may also be provided in combination in a single embodiment and the present description is to be construed as if such embodiments are explicitly set forth herein. Conversely, various features of the invention, which are, for brevity, described in the context of a single embodiment, may also be provided separately or in any suitable subcombination or may be suitable as a modification for any other described embodiment of the invention and the present description is to be construed as if such separate embodiments, subcombinations and modified embodiments are explicitly set forth herein. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. Post printing apparatus for drying and curing printed textiles, comprising:

a first drying section configured to dry or partially dry a printed textile;

a second curing section configured to cure said dried or partially dried printed textile from said first drying section.

2. The post printing apparatus of claim 1, further comprising an intermediate station between said first drying section and said second, curing section.

3. The post printing apparatus of claim 2, wherein said intermediate station is configured to apply softener to said printed textile after first section and prior to second section.

4. The post printing apparatus of claim 1, further comprising a controller configured to obtain data of the printing of said printed textile and to use said data to control at least one of drying and curing parameters of at least one of said first drying section and said second curing section respectively.

5. The post printing apparatus of claim 4, wherein said data comprises programming data of a batch of printing operations.

6. The post printing apparatus of claim 4, wherein said data comprises programming data of printing of an individual textile.

7. The post printing apparatus of claim 4, wherein said data comprises sensor data of a printer.

8. The post printing apparatus of claim 4, wherein said data comprises an indication of a density of pre-printing fluid applied to said printed textile.

9. The post printing apparatus of claim 4, wherein said data comprises an indication of an amount of ink applied to said printed textile.

10. The post printing apparatus of claim 4, wherein said data comprises an indication of a number of layers of ink applied to said printed textile.

11. The post printing apparatus of claim 4, wherein said data comprises an indication of a size of said printed textile.

12. The post printing apparatus of claim 4, wherein said data comprises an indication of a color of said printed textile prior to printing.

13. The post printing apparatus of claim 4, wherein said data comprises an indication of colors printed onto said printed textile.

14. The post printing apparatus of claim 4, wherein said controller is configured to translate said data into a time required to operate said first drying section to dry or partially dry said printed textile.

15. The post printing apparatus of claim 4, wherein said controller is configured to translate said data into a temperature required to operate said first drying section to dry or partially dry said printed textile.

16. The post printing apparatus of claim 4, wherein said controller is configured to translate said data into a time required to operate said second, curing, section to carry out said curing.

17. The post printing apparatus of claim 4, wherein said controller is configured to translate said data into a temperature required to operate said second, curing, section to carry out curing of said printed textile.

18. The post printing apparatus of claim 4, wherein hot air is provided to one or both of said first drying section and said second curing section and said controller is configured to control a temperature within said one or both of said sections by modulating an amount of said hot air.

19. The post printing apparatus of claim 4, wherein one or both of said first drying section and said second curing section comprises at least one heat emitter, and said controller is configured to control a temperature within one or both of said sections by controlling one or more parameters of said emitter.

20. The post printing apparatus of claim 19, wherein said emitter is one member of the group comprising a microwave emitter, an infra-red emitter and a radio frequency emitter.

21. The post-printing apparatus of claim 19, wherein said controlled parameter is one member of the group consisting of: height of the emitter in the section, radiation power, radiation time, emitter width, and an on/off duty cycle.

22. Post printing apparatus for drying and curing printed textiles, comprising:

a drying section configured to dry or partially dry a printed textile;

a second curing section configured to cure said dried or partially dried textile from said first section;

at least one sensor configured to obtain data associated with a printing process of said printed textile; and a controller, configured to obtain data from said at least one sensor and to use said data to control at least one parameter of at least one of said first, pre-curing heating, section and said second, curing, section respectively.

23. The post printing apparatus of claim 22, wherein said data comprises one or more of a textile type, humidity, print location, fluids density.

* * * * *